Nov. 27, 1928.
P. R. G. BIEDERMANN
ELECTRIC HEATER
Filed July 29, 1927
1,693,133
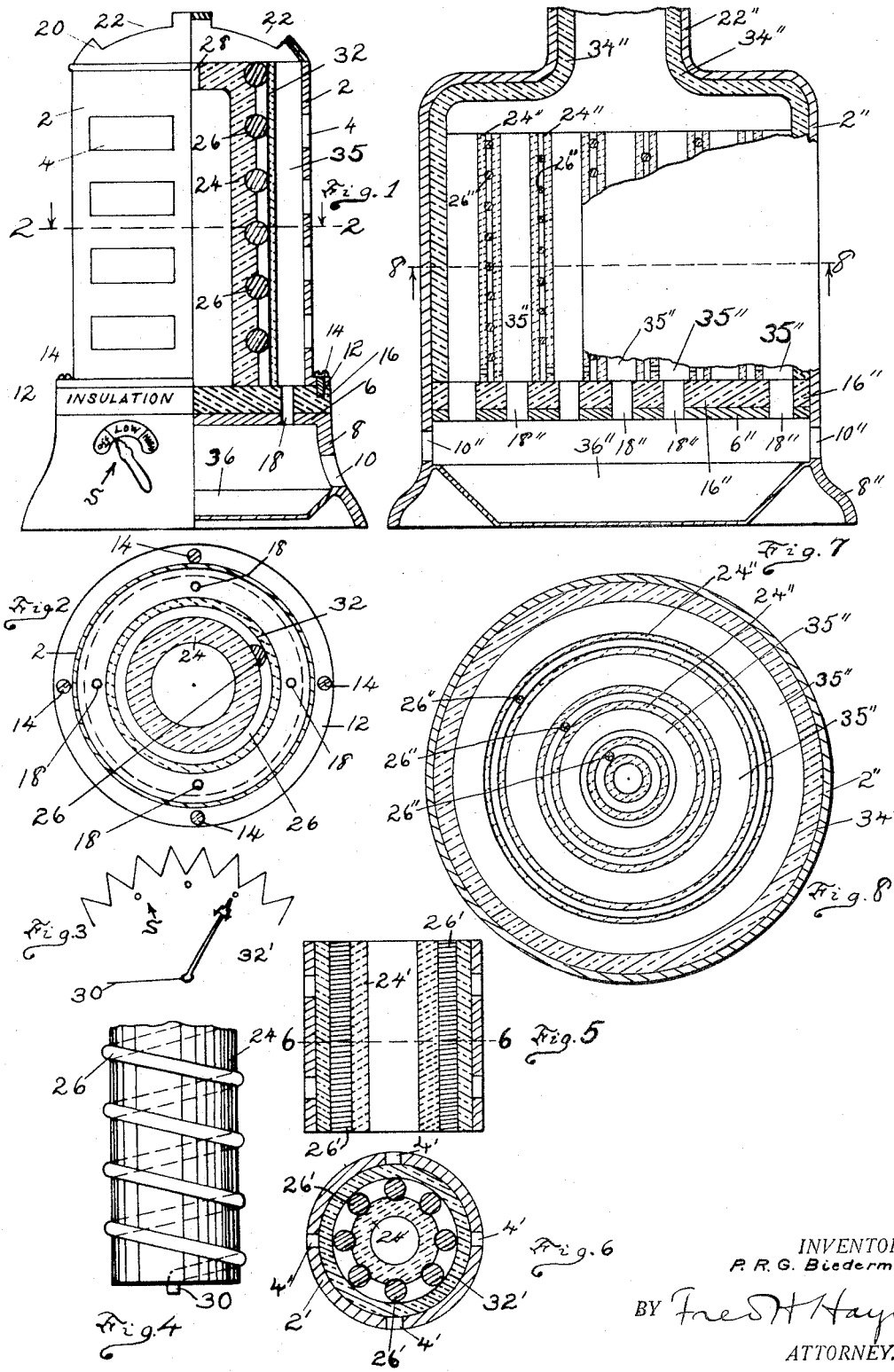
INVENTOR.
P. R. G. Biedermann
BY Fred H Hayn
ATTORNEY.

Patented Nov. 27, 1928.

1,693,133

UNITED STATES PATENT OFFICE.

PAUL ROBERT GEORGE BIEDERMANN, OF LOS ANGELES, CALIFORNIA.

ELECTRIC HEATER.

Application filed July 29, 1927. Serial No. 209,249.

My invention relates to electric heaters or hot air generators whereby individual rooms, offices and the like may be heated, as well as entire buildings, the same being heated by means of convection currents set up in the apparatus, said heaters or hot air generators having associated therewith a means for humidifying the entering air.

It accordingly is an object of my invention to provide a novel form of electric heater in which the cooler air entering a casing is heated by means of electric coils associated with one or more cylinders constructed of refractory material, which coils are adapted to heat said cylinders to incandescence, said cylinders and heating coils being insulated from said casing, which casing is also provided with air passages whereby the external air may be heated by convection currents, means being also provided for humidifying the air, and also a means for varying the electric current supply to the coils so that the intensity of heat may be varied.

The above and further objects and advantages of my invention, as will hereinafter more fully appear, I attain by the device and apparatus constructed in accordance with the specification and illustrated in the drawings accompanying the same and forming a part of my application.

Reference is had to the accompanying drawings in which similar reference characters denote similar parts. In the drawings, Fig. 1 is a part sectional and part elevational view of one form of my invention adapted for special use in heating individual rooms, offices or the like, Fig. 2 is a transverse cross-sectional view on the line 2—2, Fig. 1, looking in the direction of the arrows, Fig. 3 is a diagrammatic view of the rheostat for varying the current supplied to the heating coils, Fig. 4 is an enlarged fragmentary elevational view of the refractory cylinder associated with the form of my invention depicted in Fig. 1, Fig. 5 is a vertical cross-sectional view of another form of my invention, especially in reference to that disclosed in Figs. 1 and 2, Fig. 6 is a transverse cross-sectional view of Fig. 5, on the line 6—6 of said figure, Fig. 7 is a part sectional and part elevational view of still another form of my invention adapted for use in heating entire buildings, parts being broken away to disclose the internal construction, and Fig. 8 is a transverse cross-sectional view, taken on the line 8—8, Fig. 7.

Describing my invention more in detail, in the form depicted in Figs. 1, 2 and 4, a preferably cylindrical casing 2, provided with any desired number of perforations 4 for the exhaust of the heated air from the heater, is positioned on a base 6, which base may be integral with a suitable standard 8, equipped with one or more perforations 8 for the admission of the cooler air to the casing 2.

As indicated in Figs. 1 and 2, the casing 2 is equipped with a flange 12 whereby said casing may be detachably associated with the base 6 by any suitable fasteners 14, said casing, as shown, being insulated from said base preferably by the element 16 constructed of the phenol condensation product known to the trade as "bakelite".

As shown, both the base 6 and the insulating member 16 are perforated as at 18 to permit the cooler external air to enter the casing 2 admitted to the standard 8 by the passage 10, any suitable number of such holes being provided.

The top of the casing 2 is also provided with a cover 20 equipped with any desired number of holes 22, any preferred means of associating said cover with said casing being provided.

Positioned within the casing 2, and resting on the insulation member 16, is a preferably cylindrical member 24 constructed of a material which is a poor conductor of heat as well as an insulator for electric current, any refractory material desired being used for this purpose.

As seen in Figs. 1 and 4, the cylinder 24 is spirally grooved, and the electric heating coil is coiled about said cylinder, the wire being positioned in said groove, and if desired a hole 28 may be provided in the top of said cylinder.

The lower end 30 of the coil 26 is connected to one terminal of the switch or rheostat S, while the upper end is connected to the other terminal. Any preferred form of switch or means for varying the electric current may be used so that the intensity of the heat may be varied.

The cylinder 24 is of sufficient thickness to prevent any appreciable amount of heat from the coil 26 from being passed through said cylinder. Concentric with the cylinder 24 is an outer cylinder 32 slipped over the assembly cylinder 24 and coil 26, and is constructed of a refractory material which is a good conductor of heat, and will be brought to incandescence when the electric current passes through said coil.

As observed from Figs. 1 and 2, the air passage between the two cylinders 24 and 32 is restricted to a minimum, so that no heat is dissipated, but substantially all of the heat generated by the coil 26 is used to keep the outer cylinder 32 in a state of incandescence. It will also be noted that an air passage 34 is provided between the outer cylinder 32 and the perforated casing 2.

As is well known, a room containing air of a proper humidity may be kept comfortably warm at 62 degrees F., but if said room contained only dry air, it would require a temperature of at least 72 degrees F., so that if means are provided for properly humidifying the air a considerably less electric current for heating purposes will be needed.

I accordingly equip the standard 8 with a tray or other means 36, associated with said standard in any preferred way, which tray is adapted to house the water for humidifying the cooler air entering the heater.

An electric current being supplied to the coil 26 by the switch S, the cylinder 32 is heated to incandescence. The air entering at 10 is humidified by passing over the water tray 36, which air passes through the passages 18 to the casing 2, where it is heated, finally passing out through the perforations 4 and 22, thus heating the room by convection currents, which not only provides for an efficient heating of said room, but also insures a minimum consumption of electric current.

Obviously, the construction thus far described may be varied in many ways and still remain within the province of my invention. Instead of using but one coil, and a combined heat and electric current insulating cylinder, partly closed at the top, I may use a set of coils and a true cylinder. Such a construction is shown in Figs. 5 and 6 wherein the inner cylinder 24' has no top, and any preferred number of electric heating coils 26' being positioned about the periphery of said cylinder. The coils 26' are held in position by the outer refractory cylinder 32', which cylinder is adapted to be heated to incandescence. Surrounding the cylinder 32' is the casing 2', perforated as at 4' for the passage of the heat generated. It will be understood, of course, that any number of units may be provided for heating larger rooms or offices, so that the capacity of the heaters may be enlarged.

In Figs. 7 and 8 I have illustrated a modified form of my invention for use in heating entire buildings, such as office buildings, schools, churches and the like. This form may be termed a hot air generator, the heat generated being conveyed to different parts of the building to registers, radiators and the like.

This form of my invention comprises an outer shell or casing 2″, preferably shaped as shown, and equipped with a perforated base 6″ associated in any suitable way with the standard 8″, which standard is provided with the cooler air passages 10″, of any preferred number. The shell or casing 2″ is air tight, and connected with the hot air pipes of the building by the tube 22″, said shell being lined with fire clay, asbestos or the like 34″, of a thickness effectively to prevent heat losses through said shell or casing.

The shell or casing 2″ is also provided with a perforated insulating base 16″, overlapping the base 6'8, air passages 18″ being provided therein to convey the cooler external air to the air passages 34″ positioned between the concentric heating units 24″, equipped with spiral heating coils 26″, set in spiral grooves in said units, which units are constructed of the same material described in connection with the other forms of my invention, which units may be brought to incandescence. A humidifying tray 36'8, associated in any preferred manner with the standard 8″ may also be provided. The operation of this form of my invention is precisely the same as that of the other forms except that the heated air is piped to various parts of the building.

While I have thus described my invention with great particularity, it will be clear that the same may be modified throughout a wide range. I accordingly do not propose to be limited to the exact details of construction shown and described, but reserve the right in practice to make any and all modifications thereof that fall within the scope of the appended claims.

I claim as my invention:

1. An electric heater comprising a casing, a perforated base on which said casing is positioned, a perforated insulation element on said base, grooved cylinders of refractory material positioned on said element, electric heating coils partly positioned in the grooves of said cylinders for heating said cylinders to incandescence, said heater being provided with means whereby the external air may be heated by convection currents.

2. In an electric heater, a perforated base, a casing positioned on said base, means for insulating said casing from said base, cylinders of refractory material in said casing, electric heating coils associated with said cylinders for heating them to incandescence, said casing being provided with means whereby the external air may be heated by convection currents, and means associated with said heater for humidifying said air currents.

3. In an electric heater, a base, a casing detachably associated with said base, cylinders of refractory material positioned in said casing, electric heating coils associated with said cylinders for heating them to incandescence, said casing having means whereby said coils may be insulated therefrom, and means associated with said casing whereby the entering air may be humidified.

4. In an electric heater, a casing, a base upon which said casing is positioned, means for insulating said casing from said base, grooved cylinders of refractory material in said casing, means for insulating said cylinders from said casing and said base, electric heating coils partly positioned in said grooves for heating said cylinders to incandescence, said casing being provided with air passages whereby the external air may be heated by convection currents, means for varying the electric current supplied to said coils, and means associated with said casing for moistening the heated air.

In testimony whereof I have signed my name to this specification.

PAUL ROBERT GEORGE BIEDERMANN.